United States Patent [19]

Douglas et al.

[11] Patent Number: 5,732,764
[45] Date of Patent: Mar. 31, 1998

[54] TRUCK MOUNTED UTILITY BOX HEATER

[76] Inventors: Richard W. Douglas; Nancy K. Douglas, both of 1702 Utah Ave., Rock Springs, Wyo. 82902

[21] Appl. No.: 544,601

[22] Filed: Oct. 18, 1995

Related U.S. Application Data

[63] Continuation-in-part of Ser. No. 268,795, Jun. 30, 1994, abandoned.

[51] Int. Cl.⁶ .................................................. B60H 1/04
[52] U.S. Cl. ............................ 165/41; 165/122; 126/19.5; 126/226; 296/37.6; 237/12.3 R; 237/12.3 B
[58] Field of Search ............................... 126/19.5, 226, 126/271.1; 296/37.6; 165/41, 122; 237/12.3 B, 12.3 R

[56] References Cited

U.S. PATENT DOCUMENTS

| | | | |
|---|---|---|---|
| D. 303,780 | 10/1989 | Sauber | D12/157 |
| 1,369,809 | 3/1921 | Hettinger | 165/41 |
| 1,839,688 | 1/1932 | Lintern et al. | 165/41 |
| 1,859,482 | 5/1932 | Wines | 165/41 |
| 1,879,072 | 9/1932 | Butterfield | 126/19.5 |
| 2,762,570 | 9/1956 | Zimmerman | 237/12.3 R |
| 3,288,129 | 11/1966 | Fox | 126/19.5 |
| 3,499,678 | 3/1970 | Richler | 296/208 |
| 3,640,457 | 2/1972 | Colinet et al. | 237/12.3 B |
| 3,868,060 | 2/1975 | Mitchell | 165/41 |
| 4,192,457 | 3/1980 | Easterly | 237/12.3 C |
| 4,789,195 | 12/1988 | Fletcher | 296/37.6 |
| 4,967,944 | 11/1990 | Waters | 296/37.6 |
| 5,505,122 | 4/1996 | Gerrit | 126/19.5 |

FOREIGN PATENT DOCUMENTS

| | | | |
|---|---|---|---|
| 58-0000412 | 1/1983 | Japan | 237/12.3 B |

*Primary Examiner*—John K. Ford

[57] ABSTRACT

A heater for heating an enclosure associated with a motor vehicle having a liquid coolant system for storage of materials that may damaged by freezing temperatures, such as a truck utility box. The heater comprises an enclosure with an aperture in communication with the enclosure, a heat exchange means for transferring heat from coolant from the cooling system of the vehicle flowing through the heat exchange means to the air flowing adjacent to the heat exchange means, and a electrical blower means for forcing air through the heat exchange means and out of the enclosure into the enclosure through the aperture. The blower means has an electrical control means for controlling its function by a driver of the vehicle.

10 Claims, 9 Drawing Sheets

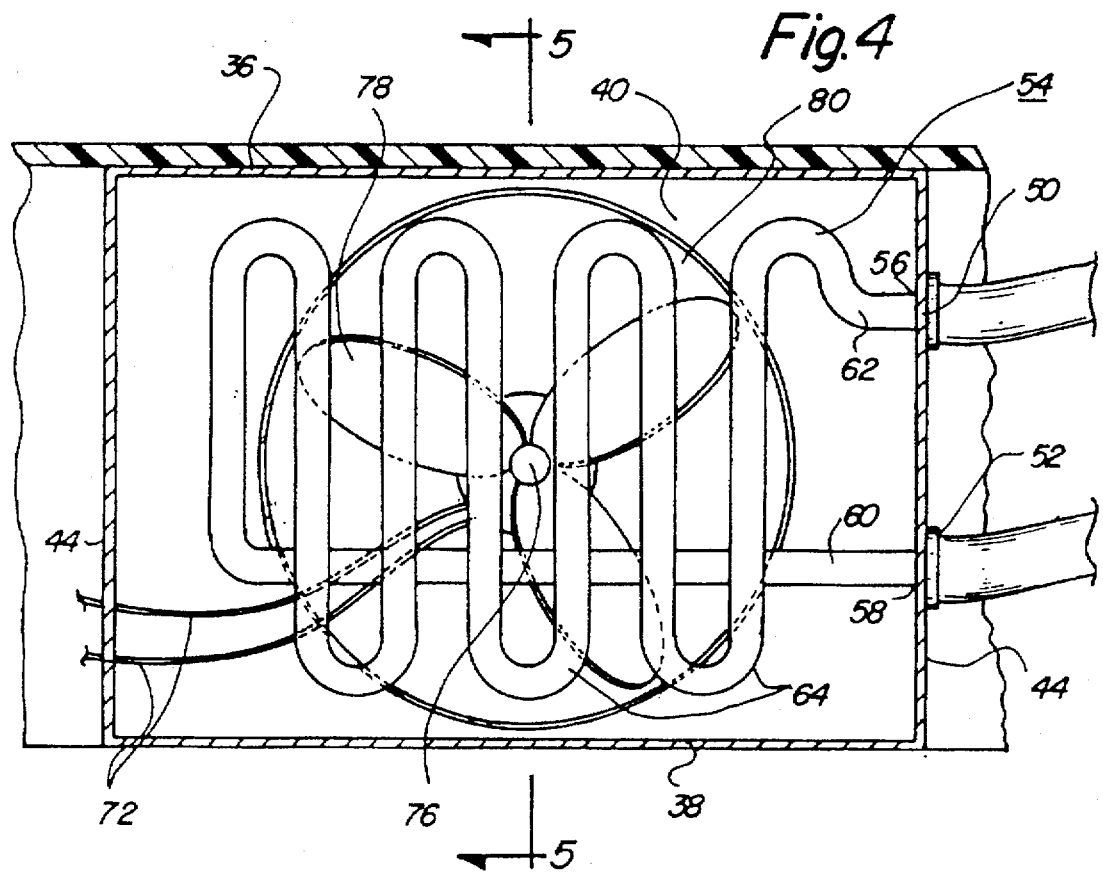
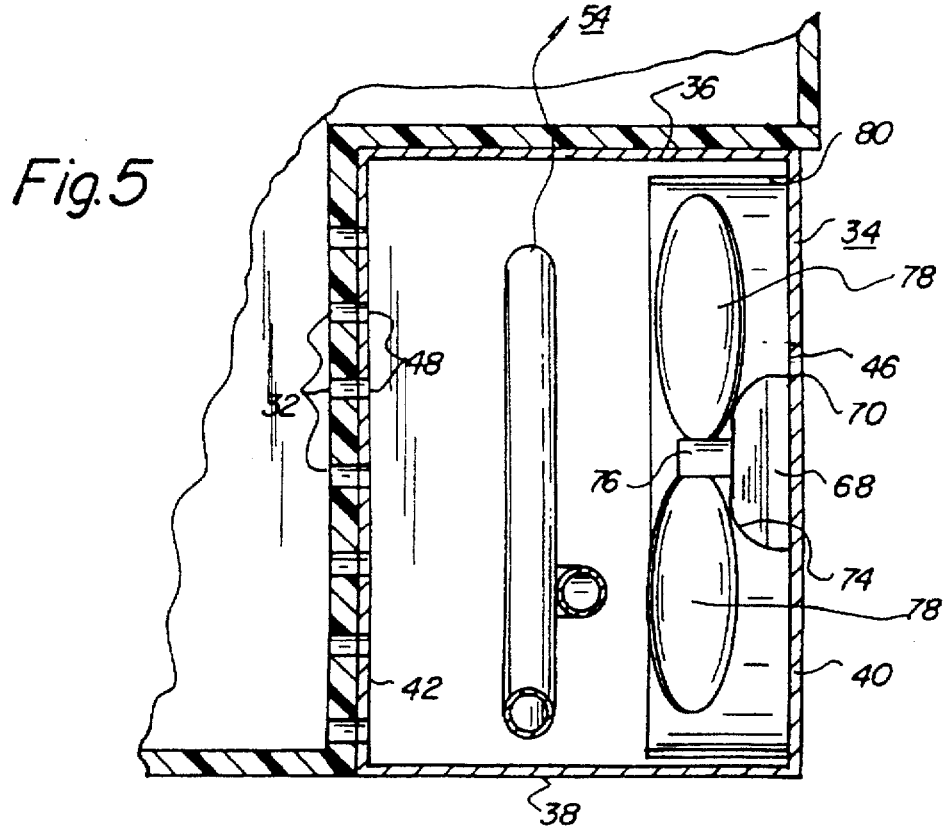

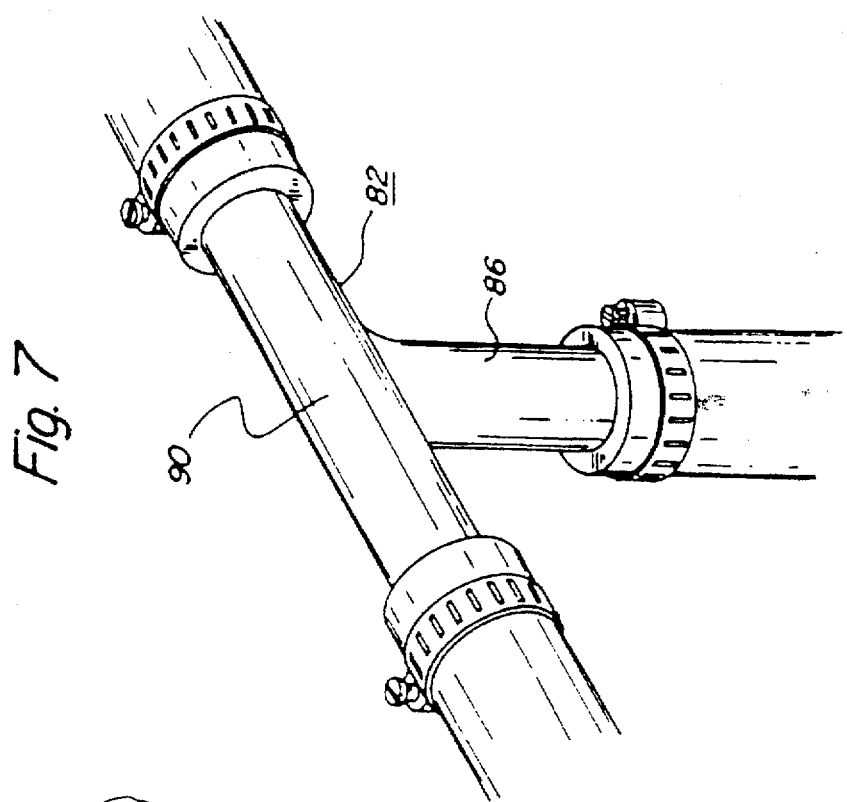
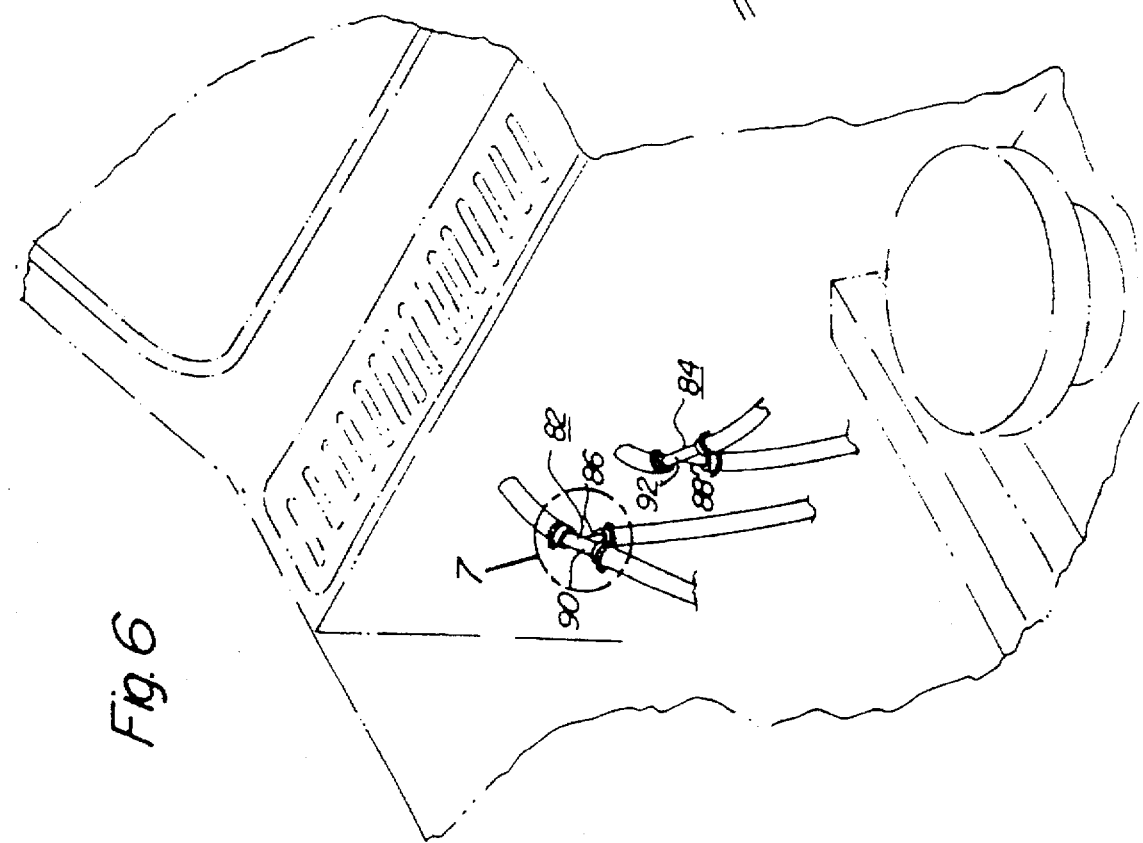

5,732,764

TRUCK MOUNTED UTILITY BOX HEATER

RELATED APPLICATIONS

This application is a continuation-in-part to U.S. patent application Ser. No. 08/268,795, filed Jun. 30, 1994, now abandoned.

FIELD OF THE INVENTION

The present invention relates to truck mounted utility box heaters and more particularly pertains to heating stored tools and supplies to prevent freezing in cold weather conditions.

DESCRIPTION OF THE PRIOR ART

The use of truck tool and utility boxes is known in the prior art. More specifically, truck tool and utility boxes heretofore devised and utilized for the purpose of storing and transporting tools and supplies are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,967,944 to Waters a truck tool box.

U.S. Pat. No. 4,789,195 to Fletcher discloses a truck tool box.

U.S. Pat. No. 4,192,457 to easterly discloses and auxiliary truck heater.

Lastly, U.S. Pat. No. Des. 303,780 to Sauber discloses a utility box for a pickup truck.

In this respect, the truck mounted utility box heaters according to the present invention substantially depart form the conventional concepts and designs of the prior art, and in doing so provide an apparatus primarily developed for the purpose of heating stored tools and supplies to prevent freeing in cold weather conditions.

Therefore, it can be appreciated that there exists a continuing need for new and improved truck mounted utility box heaters which can be used for heating stored tools and supplies to prevent freezing in cold weather conditions. In this regard, the present invention substantially fulfills this need.

SUMMARY OF THE INVENTION

In view of the foregoing disadvantages inherent in the known types of truck tool and utility boxes now present in the prior art, the present invention provides an improved truck mounted utility box heaters. As such, the general purpose of the present invention, which will be described subsequently in greater detail, is to provide a new and improved truck mounted utility box heaters and method which has all the advantages of the prior art and none of the disadvantages.

To attain this, the present invention essentially comprises a new and improved truck mounted utility box heater for use in association with a truck which has a rearwardly positioned truck bed containing a utility box. The utility box is of the type formed as a generally rectangular shaped hollow box with parallel long sides, parallel short sides, an upper region and a lower region. The upper region has a hinged lid at its uppermost extent. The lowermost extent of the upper region has a hinged lid at its uppermost extent. The lowermost extent of the upper region includes end segments which are formed contiguously with the short sides of the box. Each horizontal segment is positioned upon the sidewalls of the truck bed with the central portion of the box suspended therebetween. The lower region has side walls which are angled inwardly from the horizontal segments of the upper region and extend to the horizontal floor piece. The lower region has a front section and a rear section. The rear sections has a length equal to that of the floor piece. The rear section has a width equal to about two thirds the length of the short side edges of the box. The front section of the lower region includes a generally rectangular shaped recess which extends its entire length. The central portion of the back wall of the recess includes a plurality of apertures.

A truck mounted utility box heater comprises outer shell formed as a generally rectangular shaped hollow box. The shell has a roof, a floor, a front wall, a back wall and two side walls. The front and back walls each include a plurality of apertures. The back wall of the shell is positioned flush against the back wall of the central portion of the recess in the utility box, with the respective apertures in horizontal alignment. One of the sidewalls of the shell includes two circular holes. One of the holes is positioned near the uppermost extent of the sidewall and one is positioned near the lowermost extent of the sidewall. A heater core is formed as a hollow, generally cylindrical shaped pipe with two open ends. The open ends are positioned in a horizontal orientation parallel to each other and separated by a short distance. The open ends are each firmly positioned within and extend through the holes in the side wall of the outer shell.

The lower open end is contiguous with a long horizontal pipe. The upper open end is contiguous with a short horizontal pipe. A plurality of vertically oriented loops is positioned between the open ends of the heater core. The loops are suspended in the central region of the shell in the operative orientation. A fan comprises a semi-spherical shaped electric motor. The flat end of the motor is affixed to the central portion of the front wall of the interior of the outer shell. The wires come out of the motor on the fan, go under the truck through the fire wall, hook to the fan switch in side of the truck which is mounted on the dash wires, leaves the switch and connects to the key of the truck for off and on power. The heater switch controls the speed of the motor in the utility box heater. The motor is three speed. Also there is preferably an in-line fuse on the wiring for safety. The rounded portion of the motor has a generally cylindrical shaped shaft which extends horizontally from its center point. A plurality of generally planar oval shaped blades is affixed equidistantly around the cylindrical surface of the shaft. The plane of the blades is positioned at an angle with respect to the surface of the front wall. The fan includes a shroud formed in a generally cylindrical configuration and positioned around the fan blades to prevent contract with the heater core. The fan is adapted to force the coil heated air into the interior of the utility box in the operative orientation. Two ninety degree elbow fittings are comprised of plastic and formed in T-shaped configuration. The elbows each have a central segment with one open end and a cross segment with two open ends. A first elbow has its central segment coupled to the output hose of the radiator. One of the open ends of the cross segment is coupled to hose leading to the water pump of the truck. A second elbow has its central segment coupled to the input hose of the radiator. One of the open ends of the cross segment is coupled to the hose leading to the gooseneck connection of the truck. Two rubber hoses are formed in a long hollow tubular configuration with two open ends. A first hose has an open end which is joined to the first elbow. The opposite open end of the first hose is coupled to the end of the heater coil which extends through the upper hole in the sidewall of the outer shell. The remained of the first hose is positioned through the engine, passenger compartment and bed of; the truck. A second hose has an open end which is joined to the second elbow. The opposite open end of the second hose is coupled to the end of the heater coil which extends through the lower hole in the sidewall of the outer shell. The remainder of the second hose is positioned through the engine, passenger compartment and bed of the truck.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practices and carried out in various ways. Also, it is to be understood that the phraseology and terminology employed herein are for the purpose of descriptions and should not be regarded as limiting.

As such, those skilled in the art will appreciated that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart form the spirit and scope of the present invention.

OBJECTS OF THE INVENTION

It is therefore an object of the present invention to provide new and improved truck mounted utility box heaters which have all the advantages of the prior art truck tool and utility boxes and note of the disadvantages.

It is another object of the present invention to provide new and improved truck mounted utility box heaters which may be easily and efficiently manufactured and marketed.

It is further object of the present invention to provide new and improved truck mounted utility box heaters which are of durable and reliable constructions.

An even further object of the present invention is to provide new and improved truck mounted utility box heaters which are susceptible of a low cost of manufacture with regard to both materials and labor, and which accordingly are then susceptible of low prices of sale to the consuming public, thereby making such truck mounted utility box heaters economically available to the buying public.

Still yet another object of the present invention is to provide new and improved truck mounted utility box heaters which provide in the apparatuses and methods of the prior art some of the; advantages thereof, while simultaneously overcoming some of the disadvantages normally associated therewith.

Still another object of the present invention is to heat stored tools and supplies to prevent freezing in cold weather conditions.

Lastly, it is an object of the present invention to provide a new and improved truck mounted utility box heater for use in association with a truck which has a rearwardly positioned truck bed containing a utility box. The utility box is formed as a generally rectangular shaped hollow box. The uppermost extent of the box includes a removable lid. The box also includes vertically positioned front and rear walls, vertically positioned sidewalls, and a horizontally positioned floor. The front wall includes a plurality of apertures located proximate to the floor. A truck mounted utility box heater comprises an outer shell formed as a generally rectangular shaped hollow box. The box has a roof, a floor, a front wall, a back wall and two side walls. The front and back walls include a plurality of apertures. The back wall of the shell is positioned flush against the front wall of the utility box with the apertures in horizontal alignment. One of the sidewalls includes two centrally located circular holes, one above the other. A heater core is formed as a hollow generally cylindrical shaped pipe with two open ends. The open ends are each firmly positioned within and extend through the holes in the side wall of the outer shell. The remainder of the core extends into the hollow interior of the outer shell. A fan comprises an electric motor which is affixed to the front wall of the interior of the outer shell. The motor includes a plurality of blades extending therefrom. The wires come out of the motor on the fan, go under the truck through the fire wall, hook to the fan switch in side of the truck which is mounted on the dash wires, leaves the switch and connects to the key of the truck for off and on power. The heater switch controls the speed of the motor in the utility box heater. The motor is three speed. Also there is preferably an in-line fuse on the wiring for safety.

These together with other objects of the invention, along with the various features of novelty which characterized the invention, are pointed out with particularity in the claims annexed to and forming a part of this disclosure. For a better understanding to the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 4 is a front cross sectional view of the heater taken along line 4—4 of FIG. 3 illustrating the outer shell, heater core and fan of the apparatus.

FIG. 5 is a side cross sectional view of the outer shell, heater core and fan taken along line 5—5 of FIG. 4.

FIG. 6 is a perspective view of the two ninety degree elbow fittings and hoses of the apparatus.

FIG. 7 is an exploded perspective view of an elbow fitting and the hoses attached thereto.

DESCRIPTION OF THE PREFERRED EMBODIMENT

Figure 1:
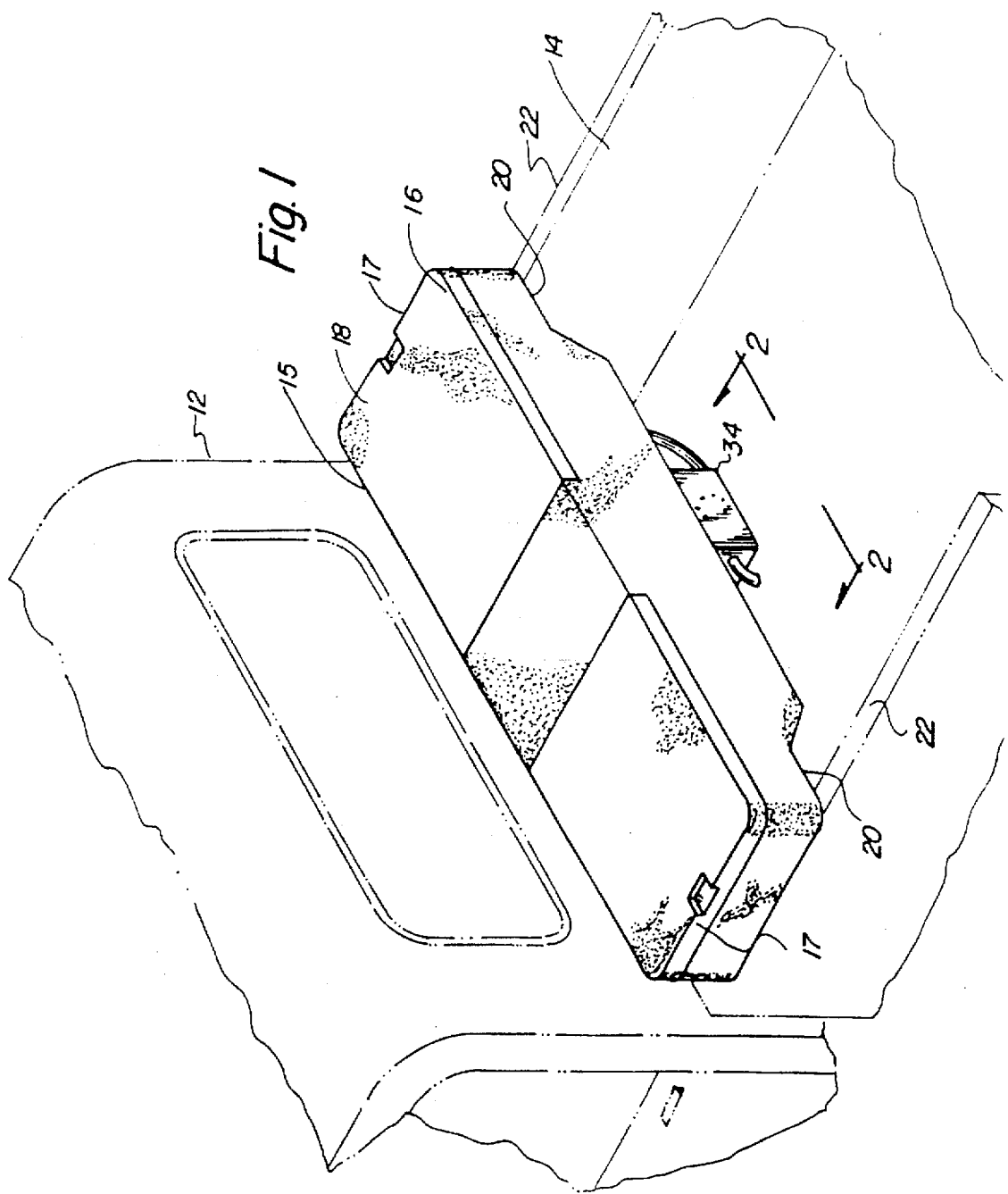
FIG. 1 is a perspective view of the preferred embodiment of the truck mounted utility box heater constructed in accordance with the principles of the present invention.
Figure 2:
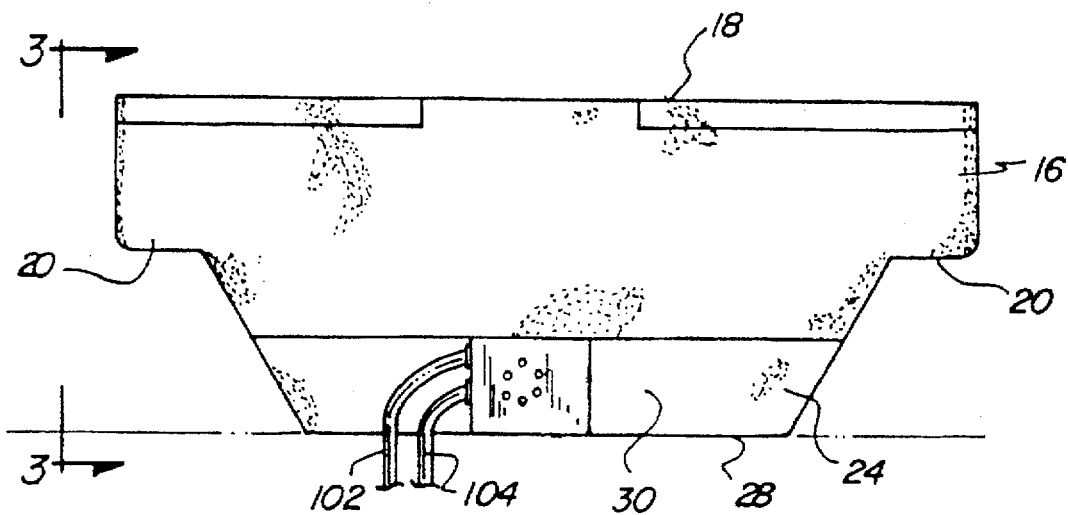
FIG. 2 is a front perspective view of the heater positioned in front of utility box of the truck.
Figure 3:
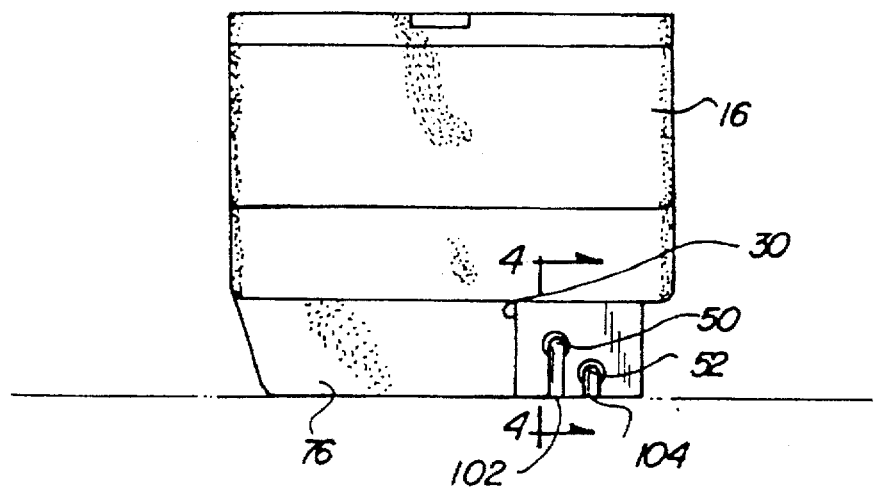
FIG. 3 is a side perspective view of the heater and utility box taken along line 3—3 of FIG. 2.

With reference now to the drawings, and in particular to FIG. 1 thereof, the preferred embodiment of the new and improved truck mounted utility box heaters embodying the principles and concepts of the present invention and generally designated by the reference numeral 10 will be described.

Specifically, it will be noted in FIGS. 1 through 7, that there is provided a new and improved truck mounted utility box heaters. The truck mounted utility box heater 10, in its broadest context, comprises an outer shell 34, a heater core 54, a fan 66, two ninety degree elbow fittings 82, 84, two rubber hoses 102, 104 and a truck 12 with a rear mounted truck bed 14 containing a utility box 16 for use in association with apparatus 10 described below.

More specifically, the truck 12 has a rearwardly positioned truck bed 14 containing a utility box 16. The utility box 16 is of the type formed as a generally rectangular shaped hollow box with parallel long sides 15, parallel short sides 17, an upper region and a lower region. The upper region has a hinged lid 18 at its uppermost extent. The lowermost extent of the upper region includes end segments 20 which are formed contiguously with the short sides of the box. Each horizontal end segment is positioned upon the sidewalls 22 of the truck bed with the central portion of the box suspended therebetween. This is a standard configuration for most truck bed mounted utility boxes. Note FIG. 1 in particular.

The lower region has side walls which are angled inwardly from the horizontal segments of the upper region and extend to the horizontal floor piece. The lower region has a front section 24 and a rear section 26. The rear section abuts the cab of the truck in the operative orientation. The rear section 26 has a length equal to that of the floor 28. The rear section 26 has a width equal to about two thirds the length of the short side edges 17 of the box. The front section 24 of the lower region includes a generally rectangular shaped recess 30 which extends its entire length. The recess allows room for placement of the heater. The central portion of the back wall of the recess includes a plurality of apertures 32. Note FIGS. 1, 2 and 3.

A truck mounted utility box heater 10 comprises an outer shell 34 formed as a generally rectangular shaped hollow box. The shell has a roof 36, a floor 38, a front wall 40, a back wall 42 and two side walls 44. The front 40 and back walls 42 each include a plurality of apertures 46, 48, respectively. The outer shell is comprised of sturdy materials to enhance the durability of the apparatus, and may be for example metal, molded and/or machined plastic materials. The back wall 42 of the shell is positioned flush against the back wall of the central portion of the recess in the utility box, with the respective apertures 34, 46 in horizontal alignment. There are is at least one aligned aperture to permit the passage of heated air from the heater into the utility box. There may be several apertures, as illustrated, or one larger aperture. The aperture or apertures may also be provided with a protective screen. One of the sidewalls 44 of the shell includes two circular holes 50, 52. One of the holes 50 is positioned near the uppermost extent of the sidewall and one hole 52 is positioned near the lowermost extent of the side wall. Note FIGS. 2 and 3.

A heater core 54 is formed a sa hollow, generally cylindrical shaped pipe with two open ends 56, 58. The open ends 56, 58 are positioned in a horizontal orientation parallel to each other and separated by a short distance. The open ends 56, 58 are each firmly positioned within and extend through the holes 50, 52 in the side wall of the outer shell. The open ends extend a short distance outside the outer shell providing inlet and outlet conduits for liquid coolant. The lower open end 58 is contiguous with a long horizontal pipe 60. The upper open end 58 is contiguous with a short horizontal pipe 62. A plurality of vertically oriented loops 64 is positioned between the open ends 56, 58 of the heater core. The loops 64 are suspended in the central region of the shell in the operative orientation to provide a portion for heat exchange from coolant in the tube to the air in the shell. The looped configuration increases the surface area located within the shell resulting a greater amount of heated air. Note FIG. 4.

A fan 66 comprises a semi-spherical shaped electric motor 68. The motor has a flat end and a rounded end. The flat end 70 of the motor 68 is affixed to the central portion of the front wall 40 of the interior of the outer shell. The wires 72 come out of the motor 68 on the fan, go under the truck through the fire wall, hook to the fan switch in side of the truck which is mounted on the dash wires, leaves the switch and connects to the key of the truck for off and on power. The heater switch controls the speed of the motor in the utility box heater. The motor is three speed. Also there is preferably an in-line fuse on the wiring for safety. The rounded portion 74 of the motor has a generally cylindrical shaped shaft 76 which extends horizontally from its center point. The shaft rotates when the fan is in the operative orientation. Note FIGS. 4 and 5.

A plurality of generally planar oval shaped blades 78 is affixed equidistantly around the cylindrical surface of the shaft 76. The plane of the blades 78 are positioned at an angle with respect to the surface of the front wall 40. The fan 66 includes a shroud 80 formed in a generally cylindrical configuration and positioned around the fan blades 78 to prevent contact with the heater core 54. The fan 66 is adapted to force air over the heated coil and the heated air into the interior of the utility box in the operative orientation. The angle of the rotating blades forces the heated air through the aligned apertures in the outer shell and utility box. The heated air cause the temperature inside the box to increase thus preventing freezing of the contents of the box. Note FIG. 5.

Figure 8:
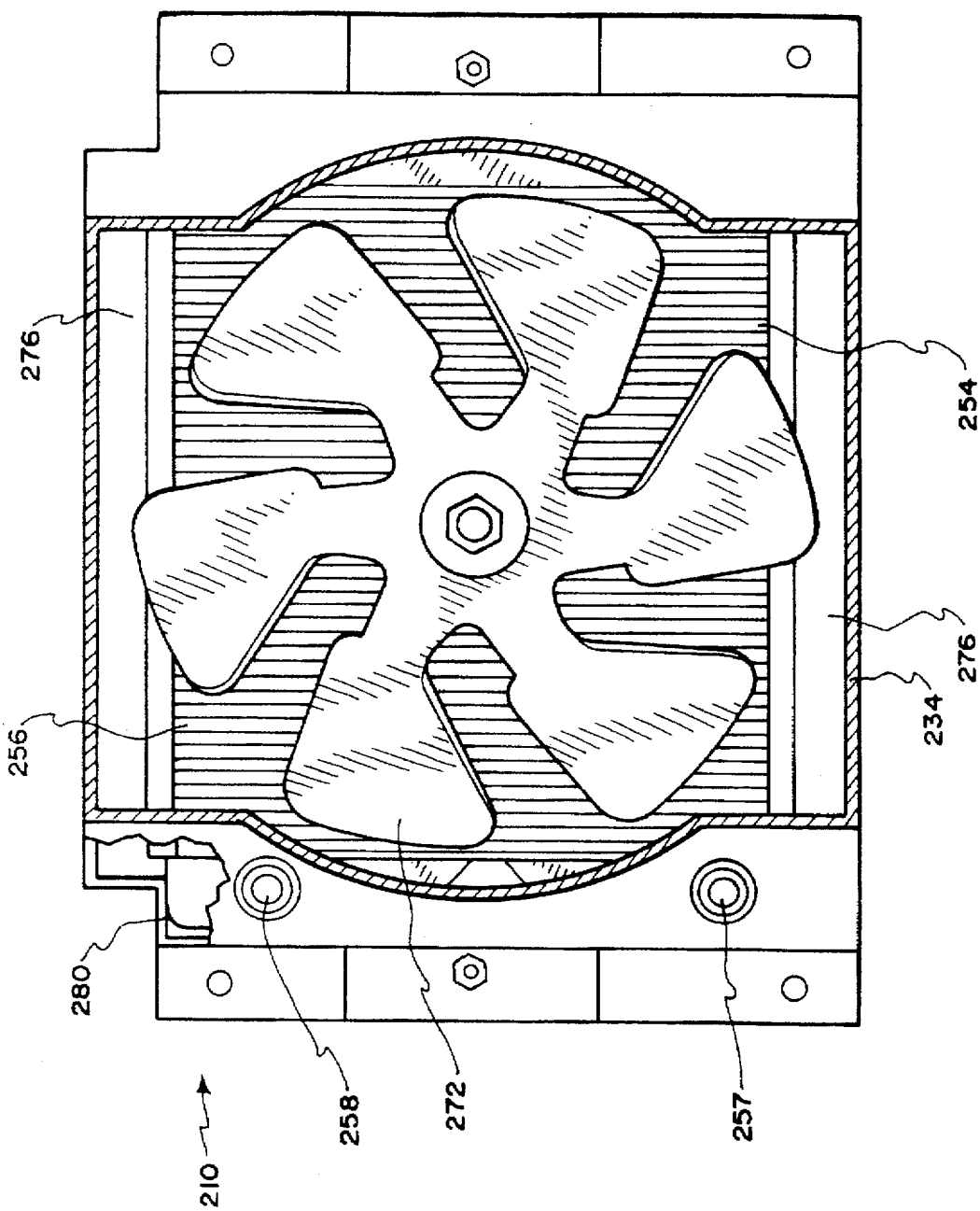
FIG. 8 is a cross sectional view taken along line 8—8 in FIG. 9 of a different heater of the invention which may be used in place of the heater illustrated in FIG. 4.
Figure 9:
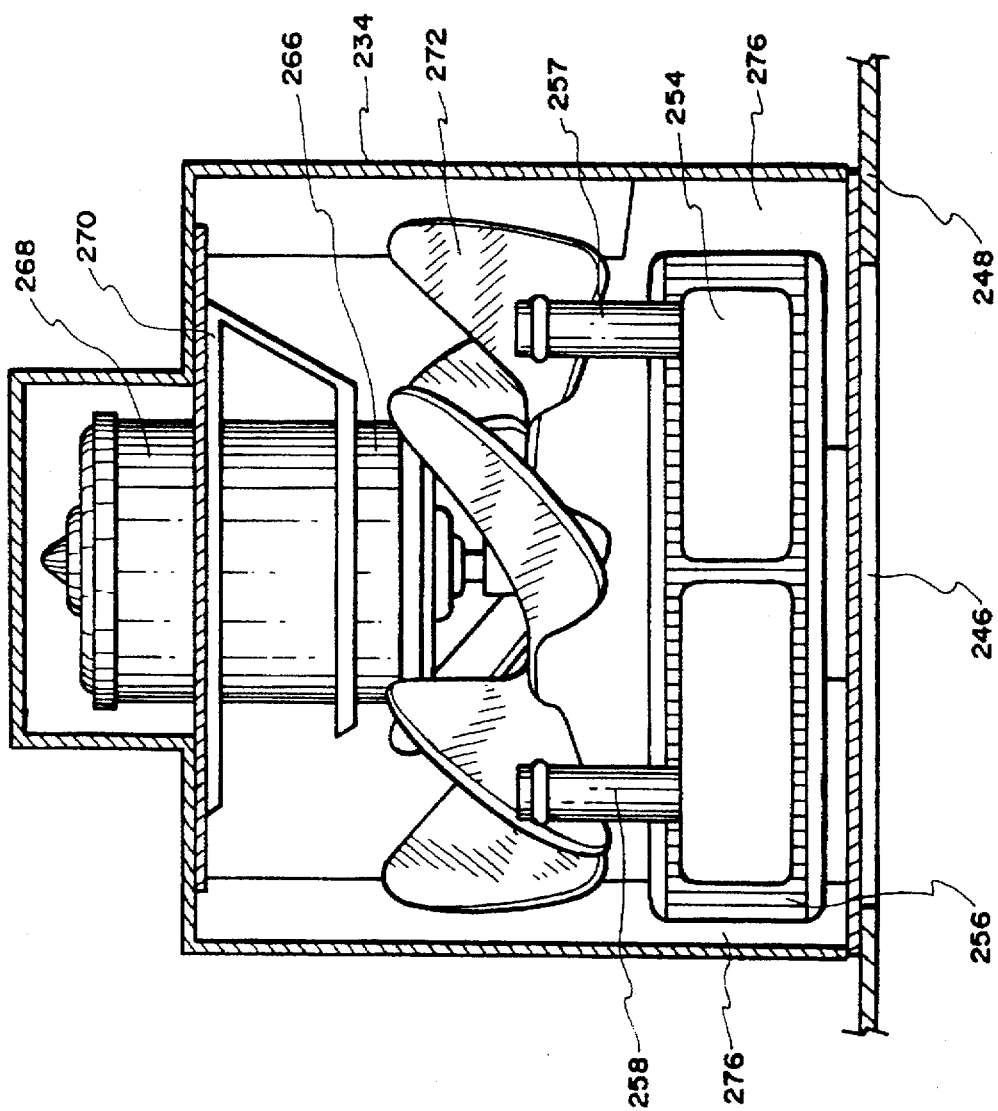
FIG. 9 is a side view of the heater box of FIG. 8 with the outer shell cut away along line 9—9 of FIG. 8.
Figure 10:
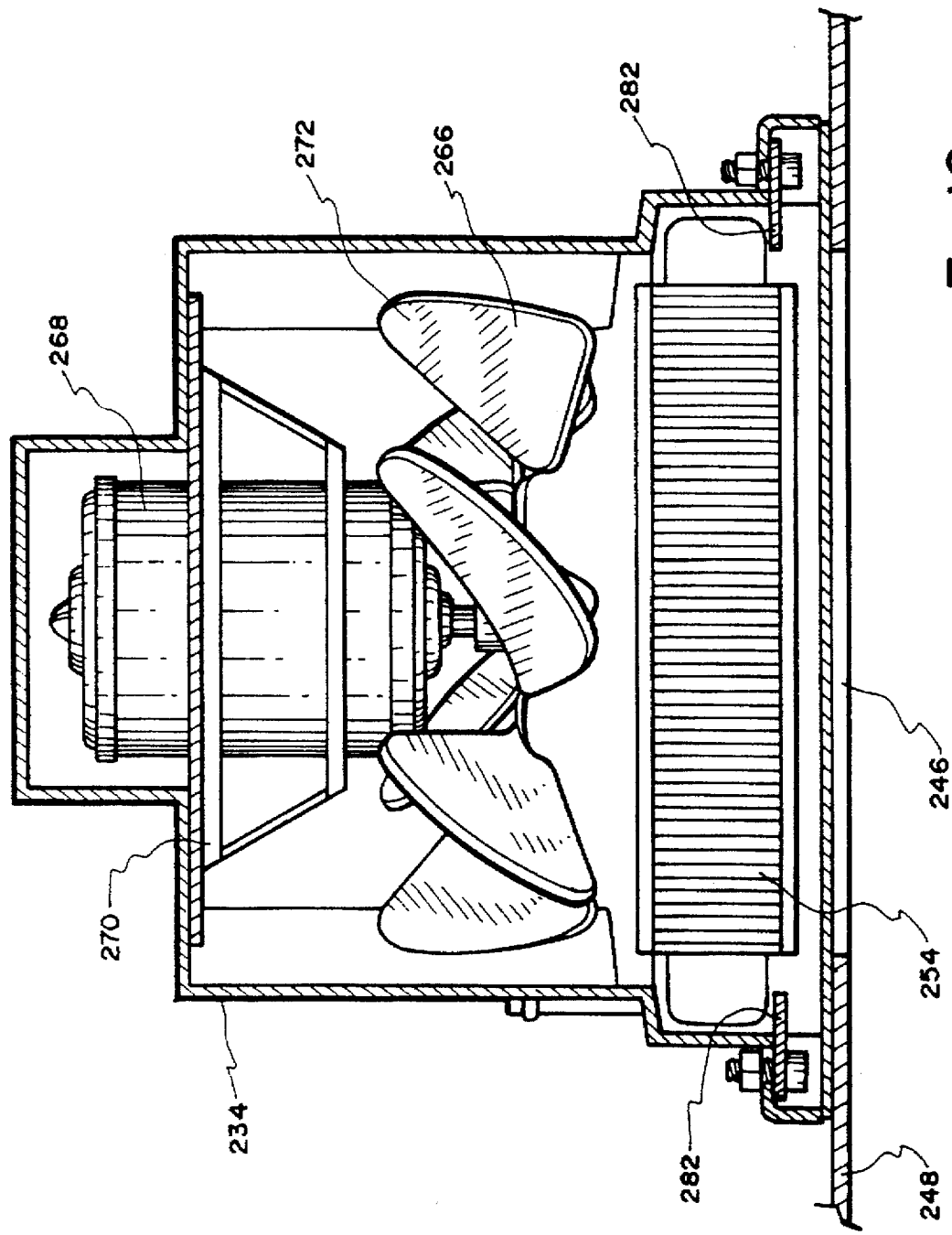
FIG. 10 is a top view of the heater box of FIG. 8 with the outer shell cut away along line A—A of FIG. 8.
Figure 11:
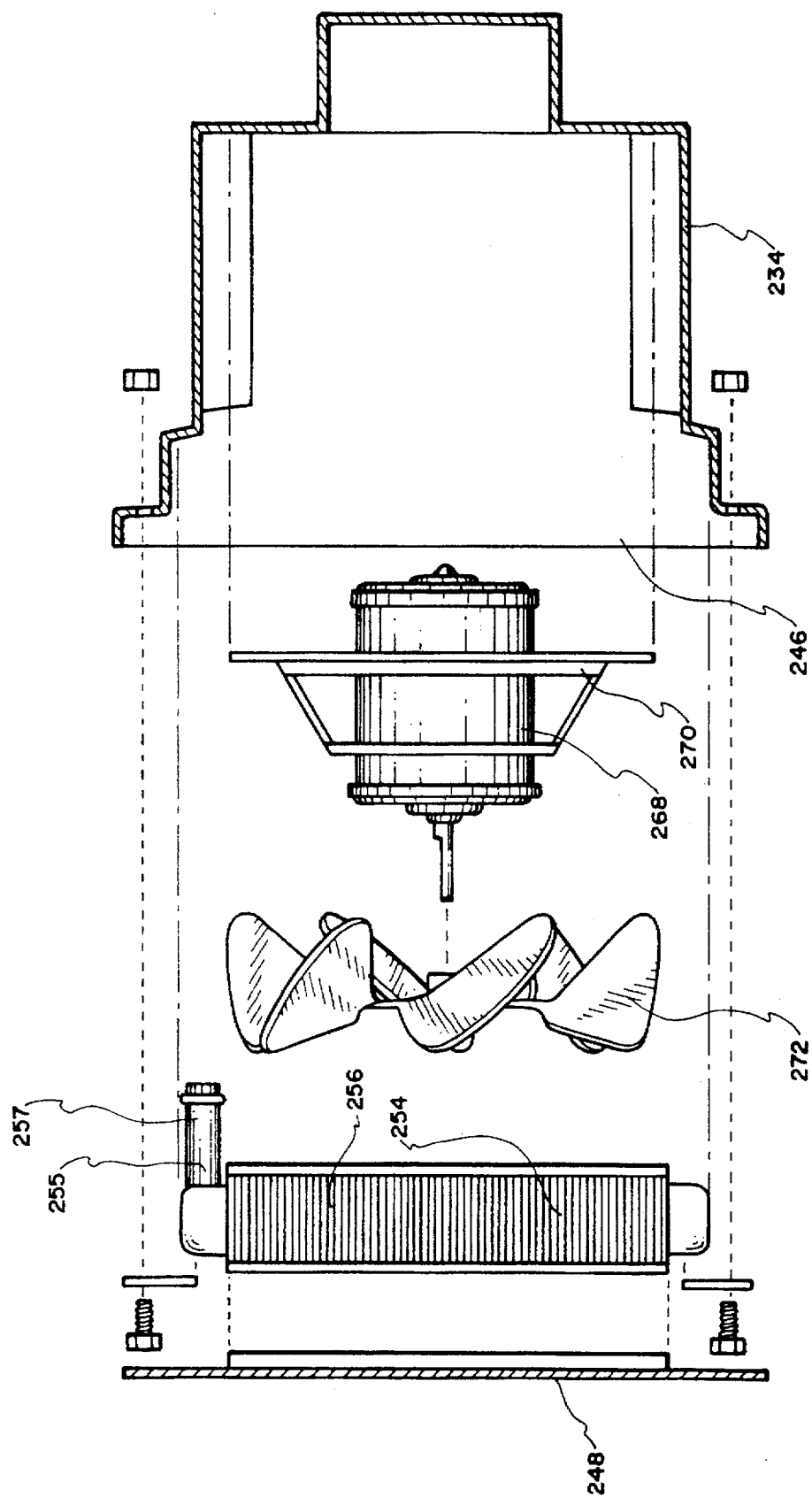
FIG. 11 is an exploded top view of the heater of FIG. 8.

Two ninety degree elbow fittings 82, 84 are comprised of plastic and formed in T-shaped configuration. The elbows 82, 84 each have a central segment 86, 88 with one open end and a cross segment 90, 92 with two open ends. A first elbow 82 has its central segment 86 coupled to coolant system of the truck through the output hose 94 of the radiator. One of the open ends of the cross segment 90 is coupled to the coolant system of the truck at the hose 96 leading to the water pump of the truck. A second elbow 84 has its central segment 88 coupled to the coolant system of the truck through the input hose 98 of the radiator. One of the open ends of the cross segment 92 is coupled to the hose 100 leading to the gooseneck connection of the truck. This configuration allows circulation of water or coolant through the heater core while also permitting normal operation of the radiator system of the vehicle. Note FIGS. 7 and 8.

Two rubber hoses 102, 104 are formed in a long hollow tubular configuration with two open ends. A first hose 102 has an open end which is joined to the first elbow 82. The opposite open end of the first hose 102 is coupled to the end of the heater core 56 which extends through the upper hole 50 in the sidewall of the outer shell. The remainder of the first hose 102 is positioned through the engine, passenger compartment and bed of the truck. The hoses are fabricated of insulated rubber to minimize heat loss during circulation. Note FIGS. 2 and 6.

A second hose 104 has an open end which is joined to the second elbow 84. The opposite open end of the second hose 104 is coupled to the end of the heater coil 58 which extends through the lower hole in the sidewall of the outer shell. The remainder of the second hose 104 is positioned through the engine, passenger compartment and bed of the truck. The hoses are positioned through the frame of the vehicle, out of view of the user. Note FIGS. 1 and 2.

The truck bed mounted utility box heater, as the name suggests, is designed to heat a utility box in the bed of a pickup truck using the existing heating system for the vehicle. It is comprised of a two lengths of rubber hose and two ninety degree plastic elbow fittings. The fittings are installed between the radiator hose and the "gooseneck" connection for the same. The hose is routed through the utility box in the bed of the vehicle and connected to the inlet side of the radiator.

Referring to FIGS. 8 to 11, which illustrate an alternate version of the heater box of the invention. The heater box may be mounted on a vertical wall of a utility box as illustrated earlier for the previously described embodiment, or by any other suitable means. The heater 210 comprises an outer shell 234 formed to provide an hollow enclosure. An aperture 246 is provided so that when the heater box is mounted on the utility box, the aperture 246 is in alignment with a corresponding aperture in the utility box to allow communication of air between the hollow enclosure and the interior of the utility box. The aperture 246 may be covered with a screen 248, or the like. The shell 234 may be of any suitable shape, e.g., generally boxlike, cylindrical, etc., as long as the aperture 246 can be suitable aligned for air communication with the interior of the utility box.

A heater core 254 is formed with conduits 255 for the passage of automobile coolant. The heater core includes a heat exchanging portion 256, the construction of which may be any suitable construction, such as a tube as described in the previous embodiment of FIG. 4, or constructed similar to conventional automobile radiator heater cores. The function of the heat exchange portion 256 is to conduct heat from coolant in the core to air passing through the heat exchange portion 256. The heater core includes a coolant inlet 257 and coolant outlet 258 positioned in a horizontal orientation parallel to each other and separated by a short distance. The coolant inlet and coolant outlet 257, 258 are each firmly positioned within the shell. For communication, with the coolant system of the vehicle, the coolant inlet and outlet 257, 258 extend through the shell and are constructed for appropriate attachment to hoses, or the like. The heater core is secured in the heater box by resting the heater core on shelves 280 and by clamps 282.

A blower or fan 266 comprising an electric motor 268, and fan blade 272 is operably positioned to force air through the heat exchange portion 256 of the heater core 254 and out force the heated air into the utility box through aperture 246. The motor is mounted in the shell by a suitable mounting bracket 270. In the illustrated embodiment, air is drawn from the utility box through the aperture 246, through the heat exchange portion 256 and returned out through the aperture. The fan blade 272 is constructed of know design and when turning counter-clockwise in FIG. 8 creates a partial vacuum on the aperture 246 side of the blade, which draws air in through the aperture and through the center of the heat exchange portion 256. The heated air is then circulated back by motions of the fan blades through the more peripheral portions of the heat exchange portion and through gaps 276 between the housing and the heater core 254, and then back out through the aperture 246 into the utility box. This is a closed system wherein air within the utility box is drawn into the heater, heated and recirculated into the heater box. The is preferred over an open system wherein outside air is drawn into the heater box and blown into the utility box, as the closed system is more efficient, which may be important when the outside air is particularly cold. The heater box, is preferably constructed as a modular unit for easy maintenance and replacement.

Figure 12:
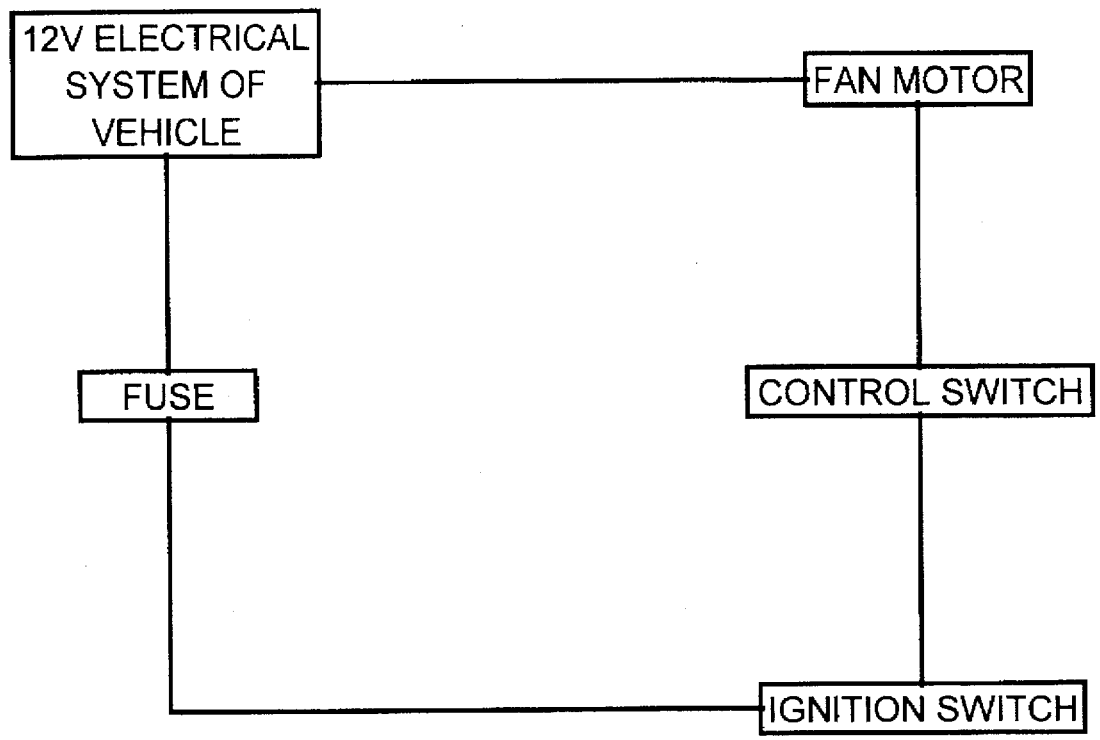
FIG. 12 is a block diagram of an electrical supply for the motor of a heater box of the invention.

The fan motor is wired to an electrical source in a manner previously described. Specifically referring to the block diagram in FIG. 12, the truck or vehicle has an electrical of 12V system conventional design, the fan motor of the heater box is connected in series with control switch for controlling the speed and on/off function of the motor. Preferably the ignition switch of the vehicle is also connected in series, along with a fuse for safety.

The heated water from the engine block is continually circulated through the utility box or may be controlled by attachment of the coolant inlets to the heater circuit of the vehicle. Since cab temperature is regulated within finite limits, the temperature in the box will be controlled approximately within this same range as heat is radiated from the hose to the box. The apparatus is ideal for use by anyone with the need to transport liquids of any type in any weather extremes. This particular application has been used in conjunction with the pest control business and chemical freezing has been completely eliminated through ambient temperatures have reached as low as minus forty degrees Fahrenheit.

The truck bed mounted utility box heater is simply fabricated, lends itself readily to high volume production, and can be inexpensively manufactured. As such, it will be attractively priced and a valuable acquisition for anyone having the need to store and transport any sort of liquids and or perishable goods.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A truck mounted utility box heater for use in association with a truck having a liquid coolant cooling system with liquid coolant, and an electrical current source, the truck also having a rearwardly positioned truck bed with a utility box positioned upon the bed, the utility box formed as a generally rectangular shaped hollow box, the uppermost extent of the box including a removable lid, the box including generally vertically positioned side, front and rear walls, and a horizontally positioned floor, a vertical wall of the utility box including at least one aperture, the box heater comprising;

an outer shell defining an enclosure, the enclosure having a vertical wall with at least one aperture in alignment with the aperture of the vertical wall of the utility box, a heater core, the heater core comprising coolant heat-exchange portion comprising coolant conduits for conducting heat from the coolant to air passing through the heat-exchange portion, and coolant inlet and outlet conduits extending through the outer shell, the inlet and outlet conduits in communication with the cooling system of the truck such that hot coolant from the cooling system of the truck flows into the heater core by the inlet conduit, through the heat-exchange portion, and out by the outlet conduit, an electrical fan for forcing air through the heat exchange portion, and into the utility box through the aligned apertures of the outer shell and the utility box, the electrical fan being electrically connected to the electrical source of the truck and comprising on/off control available to a person in the cab of the truck.

2. The utility box heater of claim 1 wherein the air is drawn through the aperture from the utility box into the enclosure, through the heater core, and returned to the utility box through the aperture.

3. The utility box heater of claim 1 wherein the coolant inlet and outlet are in communication with a vehicle heater circuit of the coolant system such that flow of coolant through the heater core is regulated along with regulation of the vehicle heater.

4. The utility box heater of claim 1 wherein the control comprises a series circuit of the fan, the on/off control switch, a keyed ignition on/off switch of the truck, and an in-line fuse.

5. The utility box heater of claim 4 wherein the fan comprises a motor that is multispeed and the on/off control switch includes controller for controlling the speed of the fan.

6. A truck mounted heated utility box for use in association with a truck having a liquid coolant cooling system, and an electrical current source, the truck also having a rearwardly positioned truck bed, the utility box adapted to be positioned upon the truck bed, the utility box formed as a generally rectangular shaped hollow box, the uppermost extent of the box including a removable lid, the box including generally vertically positioned side, front and rear walls, and a horizontally positioned floor, an outer shell defining an enclosure, the enclosure having a vertical wall with at least one aperture in alignment with the aperture of the vertical wall of the utility box, a heater core comprising coolant heat-exchange portion comprising coolant conduits for conducting heat from the coolant to air passing through the heat-exchange portion, and coolant inlet and outlet conduits extending through the outer shell, the inlet and outlet conduits in communication with the cooling system of the truck such that hot coolant from the cooling system of the truck flows into the heater core by the inlet conduit, through the heat-exchange portion, and out by the outlet conduit, a fan for forcing air though the heat exchange portion, and into the utility box through the aligned apertures of the outer shell and the utility box, the electrical fan being electrically connected to the electrical source of the truck and comprising on/off control available to a person in the truck.

7. The utility box of claim 6 wherein the coolant inlet and outlet are in communication with a vehicle heater circuit of the coolant system such that flow of coolant through the heater core is regulated along with regulation of the vehicle heater.

8. The utility box of claim 6 wherein the air is drawn through the aperture from the utility box into the enclosure, through the heater core, and returned to the utility box through the aperture.

9. The utility box of claim 6 wherein the control comprises a series circuit of the fan, the on/off control, a keyed ignition on/off switch of the truck, and an in-line fuse.

10. The utility box of claim 9 wherein the fan includes a motor that is multispeed and the on/off switch includes controller for controlling the speed of the fan.

* * * * *